United States Patent
Koga (10) Patent No.: US 12,017,704 B2
(45) Date of Patent: Jun. 25, 2024

(54) REINFORCING STEEL MEMBER FOR MOTOR VEHICLE

(71) Applicant: NIPPON STEEL CORPORATION, Tokyo (JP)

(72) Inventor: Atsuo Koga, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 367 days.

(21) Appl. No.: 17/422,837

(22) PCT Filed: Mar. 16, 2020

(86) PCT No.: PCT/JP2020/011341
§ 371 (c)(1),
(2) Date: Jul. 14, 2021

(87) PCT Pub. No.: WO2020/189600
PCT Pub. Date: Sep. 24, 2020

(65) Prior Publication Data
US 2022/0081043 A1  Mar. 17, 2022

(30) Foreign Application Priority Data
Mar. 18, 2019 (JP) .................................. 2019-050375

(51) Int. Cl.
*B32B 15/08* (2006.01)
*B32B 15/18* (2006.01)
(Continued)

(52) U.S. Cl.
CPC ............ *B62D 29/001* (2013.01); *B32B 15/08* (2013.01); *B32B 15/18* (2013.01); *B32B 27/12* (2013.01);
(Continued)

(58) Field of Classification Search
CPC ................................ B32B 15/18; B32B 15/08
See application file for complete search history.

(56) References Cited

U.S. PATENT DOCUMENTS 6,602,062 B1 * 8/2003 Torii ................... B29C 45/1705
425/4 R
2005/0244660 A1 * 11/2005 Yuasa .................... C09D 5/082
428/323
(Continued)

FOREIGN PATENT DOCUMENTS

JP  2006-281741 A  10/2006
JP  2010-253801 A  11/2010
(Continued)

*Primary Examiner* — Tong Guo
(74) *Attorney, Agent, or Firm* — Birch, Stewart, Kolasch & Birch, LLP (57) ABSTRACT

A reinforcing steel member for a motor vehicle of the present invention includes a steel sheet, a first resin material disposed on at least a part of a surface of the steel sheet, and a second resin material disposed on at least a part of a surface of the first resin material and having a matrix resin and a reinforcing fiber material contained in the matrix resin, in which in a cross section of the first resin material and the second resin material perpendicular to the surface of the steel sheet, between one end portion of the second resin material and the other end portion of the second resin material, there is a portion having a length of 80 mm or more along a boundary between the second resin material and the first resin material, in the first resin material, a protrusion portion having a length X of 3.0 mm or more from the two end portions of the second resin material to an end portion of the first resin material is formed in the cross section, and a Young's modulus of the first resin material at room temperature is $1/10$ or less of a Young's modulus of the second resin material at room temperature.

7 Claims, 2 Drawing Sheets

(51) Int. Cl.
*B32B 27/12* (2006.01)
*B32B 27/20* (2006.01)
*B62D 29/00* (2006.01)

(52) U.S. Cl.
CPC .......... *B32B 27/20* (2013.01); *B32B 2250/03* (2013.01); *B32B 2260/021* (2013.01); *B32B 2260/046* (2013.01); *B32B 2262/106* (2013.01); *B32B 2307/546* (2013.01); *B32B 2307/732* (2013.01); *B32B 2605/00* (2013.01)

(56) References Cited

U.S. PATENT DOCUMENTS

| | | | | |
|---|---|---|---|---|
| 2010/0024941 | A1* | 2/2010 | Hara | B60C 1/0008 |
| | | | | 428/476.3 |
| 2010/0279120 | A1* | 11/2010 | Naritomi | B29C 66/1122 |
| | | | | 29/527.1 |
| 2011/0180211 | A1* | 7/2011 | Jurischka | B29C 66/91421 |
| | | | | 156/322 |

FOREIGN PATENT DOCUMENTS

| | | |
|---|---|---|
| JP | 2013-244614 A | 12/2013 |
| JP | 2018-30246 A | 3/2018 |

\* cited by examiner

REINFORCING STEEL MEMBER FOR MOTOR VEHICLE

TECHNICAL FIELD OF THE INVENTION

The present invention relates to a reinforcing steel member for a motor vehicle. Priority is claimed on Japanese Patent Application No. 2019-050375, filed Mar. 18, 2019, the content of which is incorporated herein by reference.

RELATED ART

Fiber reinforced plastics (FRP) obtained by compounding a matrix resin with reinforcing fibers (for example, glass fibers and carbon fibers) are lightweight and excellent in tensile strength, workability, and the like. Therefore, FRP is widely used from consumer fields to industrial applications. In the automobile industry as well, in order to satisfy the needs for reducing the weight of a vehicle body, which leads to improvements in fuel economy and other performances, the application of FRP to vehicle members has been studied in view of the weight reduction, tensile strength, workability and the like of FRP.

Among them, carbon fiber reinforced plastics (CFRP), which use carbon fiber as a reinforcing fiber, are particularly lightweight due to the strength of the carbon fiber and particularly excellent in tensile strength, and thus are promising materials for various applications including vehicle members.

On the other hand, since the matrix resin of FRP is generally a thermosetting resin such as an epoxy resin and has brittleness, there is a possibility of brittle fracture when deformed. Further, since FRP using a thermosetting resin as the matrix resin does not undergo plastic deformation, bending cannot be performed once the FRP is cured. Furthermore, FRP is generally expensive and causes an increase in cost of various members such as vehicle members.

On the other hand, in order to solve these problems while maintaining the above-mentioned advantages of FRP, recently, a reinforcing member has been studied in which FRP is laminated on a part of a vehicle member and reinforced. In this technology, since FRP is laminated only on a portion to be reinforced in the vehicle member, an increase in weight is suppressed as much as possible, and performance can be efficiently improved. Further, by compounding a low-cost steel sheet and FRP, the use amount of FRP can be reduced, so that the cost of the vehicle member can be reduced. For example, Patent Document 1 proposes a steel sheet reinforcing sheet including a glass cloth and a resin layer, in which the resin layer contains rubber and an epoxy resin. Patent Document 2 proposes a fiber reinforced composite material molded article in which a thermoplastic resin is injection-molded to be joined and integrated on a surface of a sheet-shaped fiber reinforced composite material in which reinforcing fibers are impregnated with a matrix resin. Patent Document 3 proposes a composite resin molded article of a first resin member made of a thermoplastic resin and a second resin member made of a carbon fiber reinforced resin reinforced with carbon fibers. Patent Document 4 proposes a reinforcing structure including a resin layer made of a resin composition and disposed on an adherend and a restraining layer made of a reinforcing material and disposed on the resin layer.

PRIOR ART DOCUMENT

Patent Document

[Patent Document 1] Japanese Unexamined Patent Application, First Publication No. 2006-281741

[Patent Document 2] Japanese Unexamined Patent Application, First Publication No. 2010-253801

[Patent Document 3] Japanese Unexamined Patent Application, First Publication No. 2013-244614

[Patent Document 4] Japanese Unexamined Patent Application, First Publication No. 2018-30246

DISCLOSURE OF THE INVENTION

Problems to be Solved by the Invention

Incidentally, in a case where a paint baking treatment is performed on a reinforcing member reinforced by laminating an FRP used for a vehicle member, that is, a reinforcing steel member for a motor vehicle, since heating is performed, stress is generated between the FRP and the steel sheet due to curing shrinkage of the FRP or a difference in linear expansion coefficient between the FRP and the steel sheet. In particular, since the restraint conditions are different from those of other FRP laminated portions in the vicinity of the end portion of FRP laminated on the steel sheet, a large stress is likely to be generated. The generated stress causes a decrease in the adhesion between FRP and the steel sheet, and in some cases, causes exfoliation of FRP to be peeled off from the steel member. Further, in a case where the steel sheet constituting the steel member is relatively thin, the steel sheet may be locally distorted due to stress, resulting in poor external appearance.

Further, in an actual use environment, water or steam may be present around the steel member. In the portion on which the FRP is disposed on the steel sheet, water tends to accumulate around the FRP on the surface of the steel sheet due to the thickness of the FRP, and the possibility of corrosion of the steel sheet increases. Further, the accumulated water may enter the interface between the FRP and the steel sheet, and the adhesion may decrease with time. Furthermore, in a case where CFRP is used as the FRP, since the carbon fibers have conductivity, the carbon fibers and the steel sheet are physically in contact with each other via water to cause electrolytic corrosion (dissimilar material contact corrosion).

Therefore, the present invention has been made in view of the above problems, and an object of the present invention is to provide a reinforcing steel member for a motor vehicle capable of suppressing generation of stress between a steel sheet and an FRP due to heat, maintaining adhesion between the steel sheet and the FRP even in an environment in which water or steam may be present around the steel sheet, and suppressing corrosion of the steel sheet.

Means for Solving the Problem

The present inventors have focused on the configuration of a first resin material used for adhering an FRP (second resin material) to a steel sheet by diligent research to achieve the above object. Further, the present inventors have found that the stress between the fiber reinforced plastic and the steel sheet due to heating can be relaxed by setting the Young's modulus of the first resin material at room temperature to a predetermined value and causing an end portion of the first resin material to protrude outside an end portion of the fiber reinforced plastic. Furthermore, the present inventors have found that such a first resin material can maintain the adhesion between the steel sheet even in an environment in which water or steam may be present.

In order to solve the above problems, the present invention has adopted the following aspects.

(1) A reinforcing steel member for a motor vehicle according to an embodiment of the present invention includes a steel sheet, a first resin material disposed on at least a part of a surface of the steel sheet, and a second resin material disposed on at least a part of a surface of the first resin material and having a matrix resin and a reinforcing fiber material contained in the matrix resin, in which in a cross section of the first resin material and the second resin material perpendicular to the surface of the steel sheet, between one end portion of the second resin material and the other end portion of the second resin material, there is a portion having a length of 80 mm or more along a boundary between the second resin material and the first resin material, in the first resin material, a protrusion portion having a length X of 3.0 mm or more from the two end portions of the second resin material to an end portion of the first resin material is formed in the cross section, and a Young's modulus of the first resin material at room temperature is 1/10 or less of a Young's modulus of the second resin material at room temperature.

(2) In the reinforcing steel member for a motor vehicle according to (1) above, the length X may be 5.0 mm or more.

(3) In the reinforcing steel member for a motor vehicle according to (1) or (2) above, the length X may be 30.0 mm or less.

(4) In the reinforcing steel member for a motor vehicle according to any one of (1) to (3) above, at least a part of the second resin material in a thickness direction may be embedded in the first resin material.

(5) In the reinforcing steel member for a motor vehicle according to (4) above, a thickness of the embedded portion of the second resin material embedded in the first resin material may be 5% or more and 50% or less with respect to a thickness of the second resin material.

(6) In the reinforcing steel member for a motor vehicle according to any one of (1) to (5) above, a side surface of the protrusion portion may be inclined toward an end portion of the steel sheet closest to the protrusion portion.

(7) In the reinforcing steel member for a motor vehicle according to (6) above, an inclination angle formed by the side surface and the surface of the steel sheet closest to the protrusion portion may be 45° or more and 90° or less.

(8) In the reinforcing steel member for a motor vehicle according to any one of (1) to (7) above, a contact angle of the first resin material with water at room temperature may be 90° or more.

(9) In the reinforcing steel member for a motor vehicle according to any one of (1) to (8) above, the first resin material may contain one or more selected from the group consisting of a rust preventive pigment and a conductive pigment.

(10) In the reinforcing steel member for a motor vehicle according to any one of (1) to (9) above, the steel sheet may be a plated steel sheet.

Effects of the Invention

As described above, according to the present invention, it is possible to suppress generation of stress between a steel sheet and an FRP due to heat, maintain adhesion between the steel sheet and the FRP even in an environment in which water or steam may be present around the steel sheet, and suppress corrosion of the steel sheet.

EMBODIMENTS OF THE INVENTION

Hereinafter, preferred embodiments of the present invention will be described in detail with reference to the accompanying drawings. In the present specification and the drawings, constitutional elements having substantially the same function and structure are denoted by the same reference numerals, and explanation of these will not be repeated.

1. Reinforcing Member

Figures 1, 2:
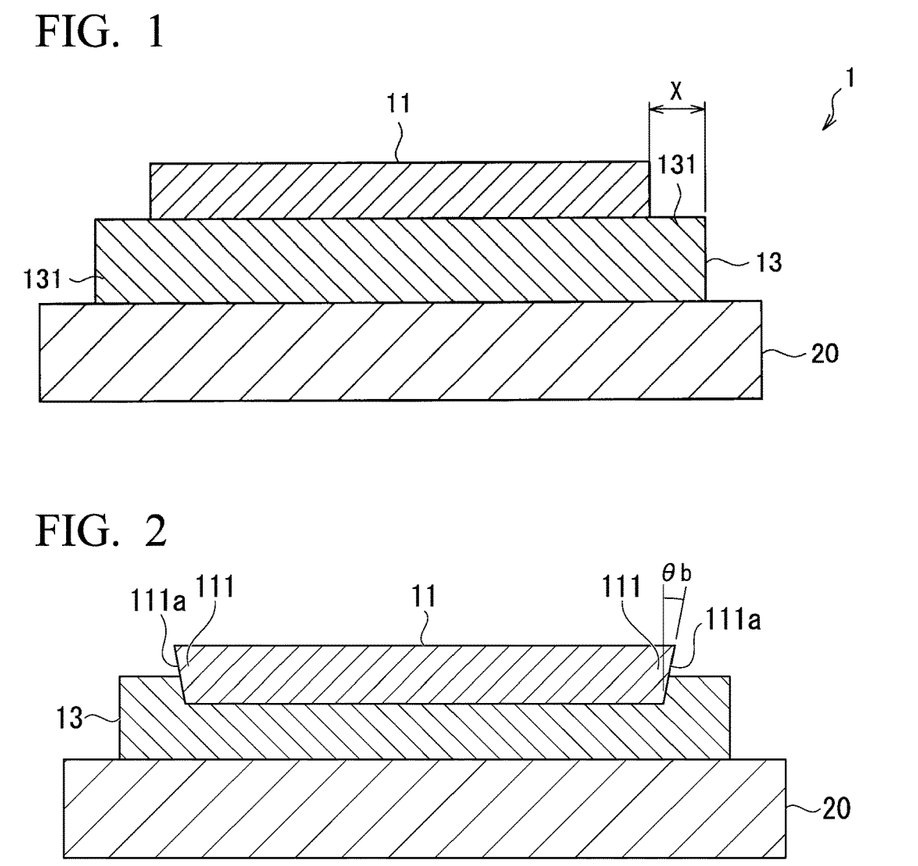
FIG. 1 is a schematic cross-sectional view of a reinforcing steel member according to an embodiment of the present invention.
FIG. 2 is a schematic cross-sectional view of a reinforcing steel member according to an embodiment of the present invention.

First, a configuration of a reinforcing steel member for a motor vehicle (hereinafter, also simply referred to as "reinforcing member") according to an embodiment of the present invention will be described. FIG. 1 is a schematic cross-sectional view of a reinforcing member 1 according to an embodiment of the present invention. The reinforcing member 1 has a steel sheet 20, a second resin material 11, and a first resin material 13.

(1.1. Steel Sheet)

The shape and thickness of the steel sheet 20 are not particularly limited as long as the steel sheet 20 can be press-molded by a press or the like, but the shape is preferably a thin plate shape. Examples of the steel sheet 20 include steel sheets such as cold-rolled steel sheets for general use, drawing or ultra-deep drawing, workable cold-rolled high tensile strength steel sheets for motor vehicles, hot rolled steel sheets for general use or processing, hot rolled steel sheets for motor vehicle structures, workable hot rolled high tensile strength steel sheets for motor vehicles, which are specified by Japanese Industrial Standards (JIS) or the like as thin steel sheets used for motor vehicles, as well as carbon steel, alloy steel, high tensile strength steel, and the like, which are used for general structures or machine structures but not limited to thin plates. The components of the steel sheet are not particularly limited, but in addition to Fe and C, one or two or more of Si, Mn, S, P, Al, N, Cr, Mo, Ni, Cu, Ca, Mg, Ce, Hf, La, Zr, and Sb may be added. One or two or more of these additive elements can be appropriately selected in order to obtain the required material strength and moldability, and the amount of these additives can be appropriately adjusted. That is, the steel sheet 20 may be a so-called iron-based alloy.

The steel sheet 20 may be subjected to any surface treatment. Here, examples of the surface treatment include, but are not limited to, various plating treatments such as zinc plating and aluminum plating, chemical conversion treatments such as chromate treatment and non-chromate treatment, and chemical surface roughening treatments such as physical or chemical etching such as sandblasting. Further, alloying of plating or plural kinds of surface treatments may be performed. As the surface treatment, it is preferable that at least a treatment for the purpose of imparting antirust properties is performed.

In particular, among the steel sheets 20, a plated steel sheet that has been subjected to plating treatment is preferable because of its excellent corrosion resistance. Examples of the plated steel sheet particularly preferable as the steel sheet 20 include a zinc-plated steel sheet, a Ni-plated steel sheet, an alloyed Ni-plated steel sheet alloyed by heat-treating these to make the Fe diffuse into the Ni plating, an Al-plated steel sheet, a tin-plated steel sheet, and a chromium-plated steel sheet. Zinc-plated steel sheets are suitable because of their excellent corrosion resistance. Examples of the zinc-plated steel sheet include a hot-dip galvanized steel sheet, zinc alloy plated steel sheet, or a hot-dip galvannealed steel sheet alloyed by heat-treating these to make the Fe diffuse into the Zinc plating, an electrolytic zinc-plated steel sheet, an electrolytic Zn—Ni plated steel sheet, a hot-dip Zn—Al alloy plated steel sheet represented by a hot-dip Zn-5% Al alloy plated steel sheet or a hot-dip 55% Al—Zn alloy plated steel sheet, and a hot-dip Zn—Al—Mg alloy plated steel sheet represented by a hot-dip Zn-1 to 12% Al-1 to 4% Mg alloy plated steel sheet or a hot-dip 55% Al—Zn-0.1 to 3% Mg alloy plated steel sheet. Of these, the Zn—Al—Mg alloy plated steel sheet is further excellent in corrosion resistance and thus is more suitable.

The shape of the steel sheet 20 is not particularly limited and may be any shape. Further, the thickness of the steel sheet 20 is not particularly limited and can be appropriately set according to the application, and can be, for example, 0.2 mm or more and 5.0 mm or less. The reinforcing member 1 includes the first resin material 13, and thus stress between the second resin material 11 and the steel sheet 20 caused by heat can be relaxed. Therefore, in a case where the steel sheet 20 is easily distorted due to the influence of stress, for example, in a case where the thickness of the steel sheet 20 is relatively small, more specifically, in a case where the thickness is 0.2 mm or more and 2.0 mm or less, the effect of the present embodiment is more prominently expressed.

(1.2. Second Resin Material)

The second resin material 11 is disposed on at least a part of a surface of the first resin material 13, which will be described later. The second resin material 11 has a matrix resin and a reinforcing fiber material contained in the matrix resin. That is, the second resin material 11 corresponds to so-called FRP.

The reinforcing fiber material is not particularly limited, but for example, carbon fiber, boron fiber, silicon carbide fiber, glass fiber, aramid fiber and the like are preferable, and carbon fiber is more preferable. As for the type of the carbon fiber, for example, any of a PAN-based carbon fiber and a pitch-based carbon fiber can be used, and may be selected according to the purpose or application. Further, as the reinforcing fiber material, one type of the above-mentioned fiber may be used alone, or a plurality of types may be used in combination.

In the FRP used as the second resin material 11, as a reinforcing fiber substrate serving as a substrate of the reinforcing fiber material, for example, a nonwoven fabric substrate using chopped fibers, a cloth material using continuous fibers, a unidirectional reinforcing fiber substrate (UD material), or the like can be used. From the viewpoint of the reinforcing effect, it is preferable to use a cloth material or a UD material as the reinforcing fiber substrate.

As the matrix resin used for the second resin material 11, either a thermosetting resin or a thermoplastic resin can be used. Examples of the thermosetting resin include an epoxy resin and a vinyl ester resin. Incidentally, in a case where a thermosetting resin is contained in the resin constituting the second resin material 11, the thermosetting resin is a thermosetting resin after curing. Examples of the thermoplastic resin include phenoxy resins, polyolefins (for example, polypropylene) and acid-modified products thereof, thermoplastic aromatic polyesters such as polyethylene terephthalate and polybutylene terephthalate, polycarbonates, polyimides, polyamides, polyamide-imides, polyetherimides, polyethersulfones, polyphenylene ethers and modified products thereof, polyarylates, polyether ketones, polyether ether ketones, polyether ketone ketones, and nylons.

Here, when a thermosetting resin is used as the matrix resin, depending on the configuration of the second resin material 11, there are problems in that the second resin material 11 has brittleness, the tact time is long, and bending cannot be performed. From the viewpoint of solving such problems, it is preferable to use a thermoplastic resin as the matrix resin. However, a thermoplastic resin generally has a high viscosity when melted, and cannot be impregnated into a reinforcing fiber material in a low-viscosity state unlike a thermosetting resin such as an epoxy resin before thermal curing, and thus the thermoplastic resin has poor impregnation properties with respect to the reinforcing fiber material. Therefore, it is not possible to increase the reinforcing fiber volume fraction (VF) in the second resin material 11 as in the case where a thermosetting resin is used as the matrix resin. Taking carbon fiber reinforced plastic (CFRP) using carbon fiber as a reinforcing fiber material as an example, in a case where an epoxy resin is used as a matrix resin, the VF can be set to about 60%, but in a case where a thermoplastic resin such as polypropylene or nylon is used as a matrix resin, VF becomes about 50%. Further, when a thermoplastic resin such as polypropylene or nylon is used, the second resin material 11 cannot have high heat resistance properties as in the case where a thermosetting resin such as an epoxy resin is used.

In order to solve the problem when such a thermoplastic resin is used, it is preferable to use a phenoxy resin as the matrix resin. Since the phenoxy resin has a molecular structure very similar to that of the epoxy resin, the phenoxy resin has the same heat resistance properties as the epoxy resin, and has good adhesiveness to the first resin material 13 and the steel sheet 20. Further, a so-called partially curable resin can be obtained by adding a curing component such as an epoxy resin to the phenoxy resin and copolymerizing them. By using such a partially curable resin as the matrix resin, it is possible to obtain a matrix resin excellent in impregnation properties into the reinforcing fiber material. Furthermore, by thermally curing the curing component in the partially curable resin, it is possible to suppress melting or softening of the matrix resin in the second resin material 11 when exposed to a high temperature as in a normal thermoplastic resin. The amount of the curing component added to the phenoxy resin may be appropriately determined in consideration of the impregnation properties of the reinforcing fiber material, the brittleness of the second resin material 11, the tact time, the workability, and the like. As described above, by using the phenoxy resin as the matrix resin, it is possible to add and control the curing component with a high degree of freedom.

For example, in a case where carbon fiber is used as the reinforcing fiber material, a sizing agent compatible with the epoxy resin is often applied to the surface of the carbon fiber. Since the phenoxy resin has a structure very similar to that of the epoxy resin, the sizing agent for the epoxy resin can be used as it is by using the phenoxy resin as the matrix resin. Therefore, cost competitiveness can be enhanced.

The second resin material 11 is formed by using at least one FRP sheet (or an FRP prepreg which is a precursor thereof). The second resin material 11 is not limited to one layer, and may be two or more layers. The thickness of the second resin material 11 and the number of layers n of the second resin material 11 in the case where the second resin material 11 has a plurality of layers may be appropriately set according to the purpose of use. In the case where there are a plurality of layers of the second resin material 11, each layer may have the same configuration or may be different. That is, the resin type of the matrix resin constituting the second resin material 11, the type and content proportion of the reinforcing fiber material, and the like may be different for each layer.

The thickness of the second resin material 11 is not particularly limited, but may be, for example, 0.4 mm or more and 4.0 mm or less, preferably 0.5 mm or more and 3.0 mm or less. With the thickness less than 0.4 mm, the stiffening and reinforcing effects may be insufficient. With the thickness more than 4.0 mm, the first resin material 13 may undergo shear distortion when the reinforcing member is distorted, so that a reinforcing effect proportional to the thickness may not be obtained. From the viewpoint of the balance between the manufacturing cost and the reinforcing effect, the upper limit may be 2.5 mm or 2.0 mm.

As shown in FIG. 2, the side surface 111a of the protrusion portion 111 of the second resin material 11 is preferably parallel to the thickness direction of the second resin material 11 or inclined at an inclination angle $\theta b$ of more than 0 degrees and less than 20 degrees so that the width thereof decreases toward the first resin material 13. $\theta b$ is an inclination angle formed by the side surface 111a and the perpendicular line of the surface of the second resin material 11 in the cross section perpendicular to the surface of the second resin material 11. In the case of manufacturing by thermocompression bonding or the like, the side surface 111a is inclined at an inclination angle $\theta b$ of more than 0 degrees and less than 20 degrees. In this case, the contact area with the first resin material 13 is increased, so that the adhesion of the second resin material 11 and the first resin material 13 is improved. On the other hand, when the side surface 111a is inclined at an angle of less than 0 degrees or 20 degrees or more, water tends to accumulate in the gap between the second resin material 11 and the first resin material 13, and the adhesion decreases. In the case where the side surfaces 111a are parallel to the thickness direction, no special processing is required, productivity is good, and adhesion can be secured. The inclination angle $\theta b$ can be obtained from shape data measured by a contact displacement meter or a non-contact displacement meter. In a case where the side surface 111a is a curved surface, for example, the inclination angle $\theta b$ can be obtained by obtaining the tangent line at the contact point between the side surface 111a and the first resin material 13.

(1.3. First Resin Material)

The first resin material 13 is an intermediate layer disposed between the second resin material 11 and the steel sheet 20. Therefore, the first resin material 13 is adhered to the second resin material 11 on one surface thereof, and the other surface is adhered to the steel sheet 20.

Figure 3:
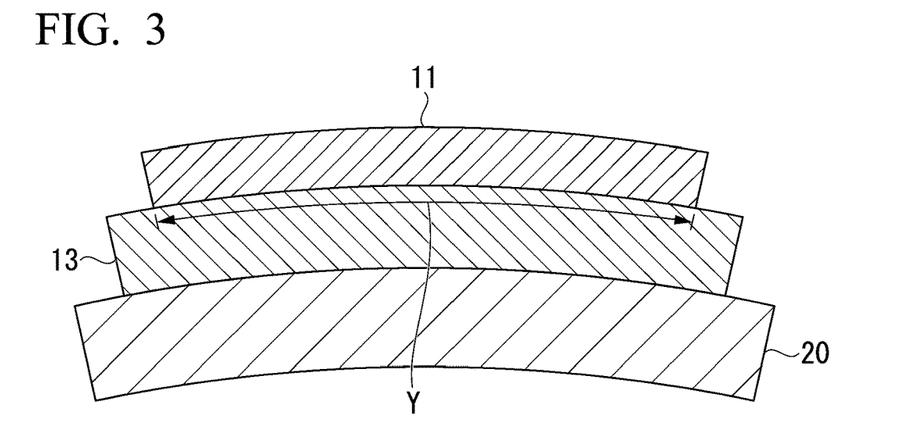
FIG. 3 is a schematic cross-sectional view for describing a reinforcing steel member according to an embodiment of the present invention.

The first resin material 13 is disposed on at least a part of a surface of the steel sheet 20. Then, in a cross section of the first resin material 13 and the second resin material 11 perpendicular to the surface of the steel sheet 20, between one end portion of the second resin material 11 and the other end portion of the second resin material 11, there is a portion having a length (Y) of 80 mm or more along a boundary between the second resin material 11 and the first resin material 13, and in the first resin material 13, a protrusion portion 131 having a length X of 3.0 mm or more from the two end portions of the second resin material 11 to an end portion of the first resin material 13 is formed in the cross section. FIG. 3 shows an example of the length (Y). In a case where the boundary between the second resin material 11 and the first resin material 13 is curved or bent, the length Y is a curved or bent length along the boundary between the second resin material 11 and the first resin material 13. When in any cross section perpendicular to the surface of the steel sheet 20, between one end portion of the second resin material 11 and the other end portion of the second resin material 11, the length (Y) along a boundary between the second resin material 11 and the first resin material 13 is less than 80 mm, it is not essential to provide the protrusion portion having the length X of 3.0 mm or more, but it is not necessary to exclude the provision of the protrusion portion having the length X of 3.0 mm or more.

The Young's modulus of the first resin material 13 at room temperature is $\frac{1}{10}$ or less of the Young's modulus of the second resin material 11 at room temperature. Here, in addition to the end portion of the first resin material 13, the end portions of the steel sheet 20 and the second resin material 11 mean end portions in a direction perpendicular to the thickness direction of the steel sheet 20 constituting the reinforcing member 1 (hereinafter, also referred to as "planar direction"). Further, room temperature in the present embodiment means 25° C. In the following description, Young's modulus at room temperature is also simply referred to as Young's modulus. As a result, it is possible to suppress generation of stress with the steel sheet 20 due to heat and maintain the adhesion between the steel sheet 20 and the second resin material 11 even in an environment in which water or steam may be present around the steel sheet 20.

More specifically, since the Young's modulus of the first resin material 13 is lower than the Young's modulus of the second resin material 11, the first resin material 13 becomes more flexible than the second resin material 11 in a heating environment, for example, during paint baking. As a result, even in a case where stress is generated between the second resin material 11 and the steel sheet 20 due to curing shrinkage of the second resin material 11 or a difference in linear expansion coefficient between the second resin material 11 and the steel sheet 20, the stress can be relaxed. As a result, in a case where when the reinforcing member 1 is exposed to a heating environment, the adhesion between the second resin material 11 and the steel sheet 20 is not significantly reduced, and exfoliation and the like are prevented. Furthermore, even in the case of the reinforcing member 1 in which the thickness of the steel sheet 20 is thin, the distortion of the steel sheet 20 can be suppressed.

Furthermore, the influence of the stress generated between the second resin material 11 and the steel sheet 20 becomes particularly large at the end portions of the second resin material 11. That is, the end portion of the second resin material 11 is easily distorted and exfoliated by the stress. In this respect, in the present embodiment, the protrusion portion 131 is formed at the end portion of the first resin material 13, and the protrusion portion 131 can cover the end portion of the second resin material 11. As a result, the stress generated at the end portion of the second resin material 11 can be further relaxed, and as a result, exfoliation and deterioration of adhesion are further prevented.

Further, in an actual use environment, water or steam may be present around the steel sheet 20, but in the present embodiment, the interface between the second resin material 11 and the steel sheet 20 is filled with the first resin material 13, and a protrusion portion 131 is formed at the end portion of the first resin material 13. Therefore, the step at the end portion of the reinforcing layer (here, the first resin material 13 and the second resin material 11) on the steel sheet 20 becomes small. This is because the protrusion portion 131 and the end portion of the second resin material 11 are gradually formed. As a result, water is less likely to accumulate at the end portion, so that water is less likely to enter the interface between the second resin material 11 and the steel sheet 20. That is, even in an environment where water or steam may be present in the surroundings, the adhesion of the second resin material 11 and the steel sheet 20 can be maintained, and exfoliation can be suppressed. Further, the corrosion of the steel sheet 20 can be suppressed.

Here, as described above, in the cross section of the first resin material 13 and the second resin material 11 perpendicular to the surface of the steel sheet 20, between one end portion of the second resin material 11 and the other end portion of the second resin material 11, there is a portion having a length (Y) of 80 mm or more along a boundary between the second resin material 11 and the first resin material 13, whereby the protrusion portion 131 is formed. However, even in a case where the length (Y) is less than 80 mm, the protrusion portion 131 may be formed over the entire end portion of the first resin material 13. By forming the entire end portion of the first resin material 13 as the protrusion portion 131, the stress between the second resin material 11 and the steel sheet 20 in a thermal environment can be further relaxed.

The length (the so-called protrusion amount) X from the distal end of the protrusion portion 131 and the distal end of the end portion of the second resin material 11 in the planar direction is preferably 5.0 mm or more and preferably 30.0 mm or less. In this case, it is possible to form the protrusion portion 131 having a sufficient width for further relieving the stress between the second resin material 11 and the steel sheet 20 in a thermal environment. Further, depending on the type of resin constituting the second resin material 11, there is a concern that stress may be generated due to the difference in linear expansion between the second resin material 11 and the steel sheet 20. The same applies when the thickness of the second resin material 11 is large. From the viewpoint of relieving such stress, the protrusion amount X is more preferably 5.0 mm or more and 15.0 mm or less. Here, the protrusion amount X of all the protrusion portions 131 may be 5.0 mm or more and 30.0 mm or less, or the arithmetical average value of the protrusion amounts X measured at a plurality of protrusion portions 131 may be 5.0 mm or more and 30.0 mm or less.

Further, the Young's modulus of the first resin material 13 is 1/10 or less of the Young's modulus of the second resin material 11 at room temperature. More preferably, the Young's modulus of the first resin material 13 is 1/100 or less of the Young's modulus of the second resin material 11 at room temperature. In this case, it is possible to further relieve the stress between the second resin material 11 and the steel sheet 20 in a thermal environment. The lower limit value of the Young's modulus of the first resin material 13 is not particularly limited, but when the lower limit value is too low, the performance of the reinforcing member 1 may be impaired, and thus the lower limit value may be, for example, 10 MPa or more.

Here, Young's modulus in the present embodiment can be measured by the following method.

The first resin material 13 and the second resin material 11 are collected from the metal portion side of the reinforcing member by machining such as cutting (milling). In a case where the first resin material 13 is a thermoplastic resin and the second resin material 11 is a thermosetting resin, heating may be performed until the first resin material 13 is softened, and the second resin material 11 may be collected.

Next, with respect to the second resin material 11, the fiber direction is measured by X-ray CT (for example, inspeXio SMX-100CT manufactured by Shimadzu Corporation). In a case where the fiber direction of the second resin material 11 is one direction, a test piece is prepared with the fiber direction as the longitudinal direction, and the Young's modulus is measured by a tensile test in accordance with JIS K7165:2008. In a case where the fiber direction of the second resin material 11 is a plurality of directions, the Young's modulus in a plurality of directions including the fiber longitudinal direction is measured, and the highest value is taken as the Young's modulus of the second resin material. Since the first resin material 13 has no anisotropic Young's modulus, a test piece in an arbitrary direction is prepared, and the Young's modulus is measured by a tensile test in accordance with JIS K7165:2008.

In a case where the first resin material 13 or the second resin material 11 having the same mechanical properties as those attached to the reinforcing member can be prepared (for example, in a case where a resin material having the same mechanical properties as those of the first resin material 13 can be prepared by subjecting the same material as the first resin material 13 to the same heat treatment as thermocompression bonding or the like, or in the case where the second resin material 11 before adhering to the steel sheet 20 is present), it is not necessary to collect the test piece from the reinforcing member by polishing or the like, and the test piece may be collected from the prepared resin material. Further, in a case where there is a document describing the Young's modulus of the resin material, the test may be omitted and the Young's modulus described in the document may be used.

Figure 6:
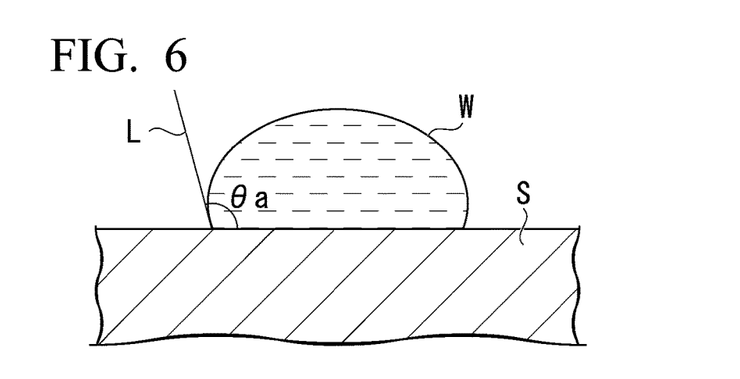
FIG. 6 is an image diagram for describing a contact angle with water.

Furthermore, the contact angle of the first resin material 13 with water at room temperature (hereinafter, also simply referred to as "contact angle") is preferably 90° or more. As shown in FIG. 6, the contact angle with water is an angle θa formed by a tangent line L of the liquid surface at the contact point between the solid S (the first resin material 13 in the present invention) and the liquid (water) W and the surface of the solid S. When the contact angle θa of the first resin material 13 is 90° or more, the first resin material 13 has sufficient hydrophobicity. The first resin material 13 is present between the second resin material 11 and the steel sheet 20, and forms an interface between them. Therefore, since the first resin material 13 having sufficient hydrophobicity is present between the second resin material 11 and the steel sheet 20, water is less likely to enter the vicinity of the interface between the second resin material 11 and the steel sheet 20, and moisture is less likely to accumulate in the gap between the second resin material 11 and the steel sheet 20 formed due to the thickness of the second resin material 11 around the second resin material 11. As a result, it is possible to prevent water from entering between the second resin material 11 and the steel sheet 20 and further lowering the adhesion with time. Furthermore, the corrosion of the steel sheet 20 is further suppressed. Furthermore, in a case where the second resin material 11 contains a conductive material such as carbon fiber, since the first resin material 13 has sufficient hydrophobicity, the occurrence of electrolytic corrosion (dissimilar material contact corrosion) due to physical contact between the carbon fiber and the steel sheet 20 is prevented.

Here, the contact angle θa of the first resin material 13 with water is preferably 90° or more and 150° or less, more preferably 90° or more and 120° or less, from the viewpoint of ensuring adhesion to the steel sheet or the adhesive.

The contact angle θa of the first resin material 13 with water can be measured by a contact angle meter (for example, a contact angle meter manufactured by Kyowa Interface Science Co., Ltd.). The contact angle in the present embodiment is a static contact angle.

The Young's modulus of the first resin material 13 and the contact angle θa with respect to water as described above can be set by appropriately selecting the type of resin constituting the first resin material 13, the weight-average molecular weight and the mixing proportion.

That is, the resin constituting the first resin material 13 may be either a thermosetting resin or a thermoplastic resin. Examples of the thermosetting resin include an epoxy resin and a vinyl ester resin. In a case where a thermosetting resin is contained in the resin constituting the first resin material 13, the thermosetting resin is a thermosetting resin after curing. Examples of the thermoplastic resin include fluororesins, phenoxy resins, polyolefins (for example, polypropylene) and acid-modified products thereof, thermoplastic aromatic polyesters such as polyethylene terephthalate and polybutylene terephthalate, polycarbonates, polyimides, polyamides, polyamide-imides, polyetherimides, polyethersulfones, polyphenylene ethers and modified products thereof, polyarylates, polyether ketones, polyether ether ketones, polyether ketone ketones, and nylons. One or two or more kinds of these resins may be mixed. By adjusting the type, weight-average molecular weight, mixing proportion, and the like of these resins, the Young's modulus of the first resin material 13 and the contact angle with water as described above can be realized. As an example, as the first resin material 13, for example, a fluororesin or the like can be used.

Further, the first resin material 13 may contain components other than the above-mentioned resin. Examples of such a component include a rust preventive pigment and a conductive pigment. The first resin material 13 may contain any one or more selected from the group consisting of a rust preventive pigment and a conductive pigment. The first resin material 13 does not contain the reinforcing fiber material used for the second resin material 11. Specifically, the first resin material 13 does not contain carbon fiber, boron fiber, silicon carbide fiber, glass fiber, aramid fiber, or the like. In order to clarify that these reinforcing fibers are not contained, the reinforcing fiber volume fraction VF in the first resin material 13 may be 1.0% or less or 0.5% or less.

Examples of the rust preventive pigment include, but are not limited to, vanadium-based rust preventive pigments, silica-based rust preventive pigments, silicate-based rust preventive pigments (for example, ferrosilicon, calcium silicate), phosphate-based rust preventive pigments (for example, magnesium phosphate), molybdate-based rust preventive pigments (for example, calcium molybdate, aluminum molybdate, barium molybdate), chromium-based rust preventive pigments (for example, strontium chromate, potassium chromate, barium chromate, calcium chromate), which may be used alone or in combination of two or more.

Examples of the conductive pigment include, but are not limited to, doped oxide particles (such as doped zinc oxide particles and doped tin oxide particles), non-oxide ceramic particles (not containing V), iron alloy particles (such as ferrosilicon particles), stainless steel particles, and particles other than iron alloys (such as metal particles and metal alloy particles).

The thickness of the first resin material 13 is not particularly limited, but may be, for example, 0.2 mm or more and 5.0 mm or less, and preferably 0.2 mm or more and 1.5 mm or less. In this case, the protrusion portion 131 can be formed more reliably in the manufacturing method described later. Further, with the thickness less than 0.2 mm, the stress relaxation may be insufficient. With the thickness more than 5.0 mm, stress relaxation may be insufficient due to stress generation during heating due to the difference in the linear expansion coefficient of the first resin material 13. From the viewpoint of a reinforcing effect, when the thickness of the second resin material 11 is large or the Young's modulus thereof is large, the lower limit thereof may be 0.3 mm, while when the thickness of the second resin material 11 is small or the Young's modulus thereof is small, the upper limit thereof may be 3.0 mm, 2.0 mm or 1.5 mm.

According to the reinforcing member 1 of the present embodiment as described above, the Young's modulus of the first resin material 13 is $\frac{1}{10}$ or less of the Young's modulus of the second resin material 11, and the protrusion portion 131 having a length X of 3.0 mm or more is formed at an end portion of the first resin material 13. Therefore, it is possible to suppress generation of stress between the steel sheet 20 and the second resin material 11 due to heating and maintain the adhesion between the second resin material 11 and the steel sheet 20 even in an environment in which water or steam may be present around the steel sheet 20. Further, corrosion of the steel sheet 20 is suppressed.

2. Method for Manufacturing Reinforcing Member

Next, a method for manufacturing the reinforcing member 1 will be described. The method for manufacturing the reinforcing member 1 is not particularly limited, and any method may be used as long as the reinforcing member 1 according to the present embodiment can be manufactured. The following method can be mentioned as an example.

(2.1. Manufacturing Method 1)

In the manufacturing method 1, first, the steel sheet 20, the resin sheet, and FRP sheet are prepared. Here, the resin sheet is a sheet that becomes the first resin material 13 after thermocompression bonding, and the FRP sheet is a sheet that becomes the second resin material 11 after thermocompression bonding. In a case where the first resin material 13 contains a thermosetting resin, the resin sheet contains a thermosetting resin before curing. In a case where the second resin material 11 contains a thermosetting resin, the FRP sheet contains a thermosetting resin before curing. The area of the resin sheet is larger than the area of FRP sheet. As a result, the protrusion portion 131 can be formed. By adjusting the area of the resin sheet and the area of FRP sheet, the protrusion amount X of the protrusion portion 131 described above can be set to a value within the range described above.

Then, the steel sheet 20, the resin sheet, and FRP sheet are laminated in this order, and the laminated body is thermocompression-bonded. As a result, the reinforcing member 1 can be manufactured. Here, the heating temperature during thermocompression bonding is not particularly limited, but may be, for example, 140° C. or higher, preferably 170° C. or higher and 250° C. or lower.

The pressure during thermocompression bonding is not particularly limited, but may be, for example, 2 MPa or more and 10 MPa or less, preferably 3 MPa or more and 5 MPa or less.

The thermocompression bonding time is not particularly limited, but may be, for example, 3 minutes or more and 60 minutes or less, preferably 5 minutes or more and 20 minutes or less. The resin sheet may be thermocompression-bonded to the steel sheet 20 in advance, and then the FRP sheet may be thermocompression-bonded to the surface of the resin sheet. Further, instead of the thermocompression bonding described above, the steel sheet 20, the resin sheet, and the FRP sheet may be bonded to each other using a room-temperature-curable adhesive.

(2.2. Manufacturing Method 2)

In the manufacturing method 2, first, a coating liquid is prepared by dissolving a resin (thermosetting resin or thermoplastic resin before curing) that becomes the first resin material 13 after thermocompression bonding in an appropriate solvent. Then, this coating liquid is applied onto the steel sheet 20 and dried to form the first resin material 13 on the steel sheet 20. By adjusting the coating area of the coating liquid, the protrusion amount X of the protrusion portion 131 can be adjusted. For example, an amount by which the first resin material 13 protrudes from an end portion of the FRP sheet (protruding length) described later is determined in advance, and the coating liquid is applied onto the steel sheet 20 in an amount by which the first resin material 13 protrudes in addition to the area of the FRP sheet (protruding length). Then, the FRP sheet is laminated on the first resin material 13 and thermocompression-bonded to manufacture the reinforcing member 1. The conditions of thermocompression bonding may be the same as those of manufacturing method 1.

(2.3. Manufacturing Method 3)

In the manufacturing method 3, the above-mentioned coating liquid is applied onto an FRP sheet and dried to prepare a sheet for reinforcing a steel sheet made of the second resin material 11 and the first resin material 13. The above-mentioned resin sheet may be laminated on an FRP sheet and pressure-bonded to produce a sheet for reinforcing a steel sheet. Then, the sheet for reinforcing a steel sheet is laminated on the steel sheet 20 and thermocompression-bonded to manufacture the reinforcing member 1. Here, in order to form the protrusion portion 131 on the first resin material 13 and set the protrusion amount X to a value within the above-mentioned range, the heating temperature may be, for example, 100° C. or higher, preferably 150° C. or higher and 300° C. or lower. Further, the pressure during thermocompression bonding may be, for example, 2 MPa or more and 10 MPa or less, preferably 3 MPa or more and 5 MPa or less. Further, the thermocompression bonding time may be, for example, 3 minutes or more and 60 minutes or less, preferably 5 minutes or more and 20 minutes or less.

In any of the manufacturing methods 1 to 3, the protrusion portion 131 may be formed afterwards. That is, after the first resin material 13 on which the protrusion portion 131 is not formed is formed by the manufacturing methods 1 to 3, a resin piece to be the protrusion portion 131 may be bonded to the end portion of the first resin material 13. Alternatively, the sheet for reinforcing a steel sheet may be manufactured by heating or thermocompression bonding using a known adhesive (for example, in the case of a thermosetting type, a structural adhesive such as an epoxy resin, and in the case of a thermoplastic type, a hot-melt adhesive) between the steel sheet 20, the resin sheet and the FRP sheet which have been molded in advance.

3. First Modification Example

One embodiment of the present invention has been described above. Hereinafter, some modification examples of the above embodiment of the present invention will be described. It should be noted that each of the modification examples described below may be applied to the above embodiment of the present invention alone or in combination. Further, each modification example may be applied in place of the configuration described in the above embodiment of the present invention, or may be additionally applied to the configuration described in the above embodiment of the present invention. Hereinafter, the differences between the above embodiment and each modification example will be mainly described, and description of similar matters will be omitted as appropriate.

Figure 4:
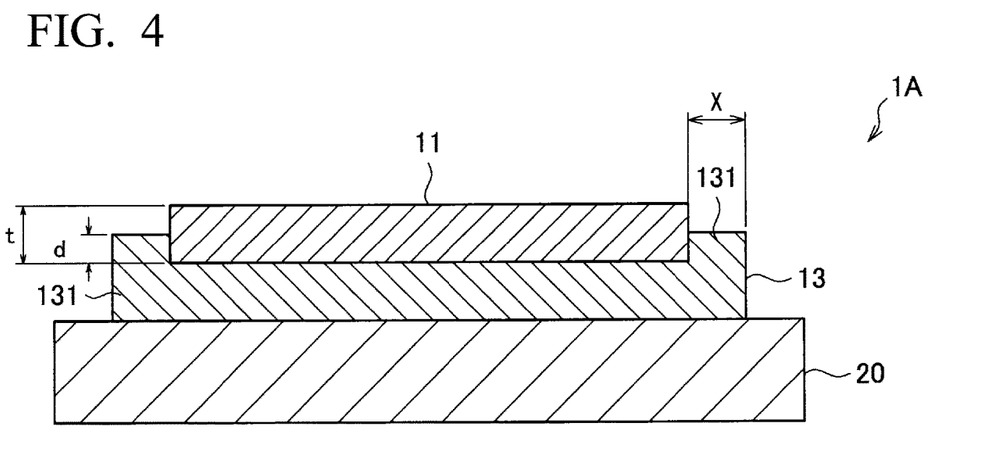
FIG. 4 is a schematic cross-sectional view of a reinforcing steel member according to a first modification example of the present embodiment.

FIG. 4 is a schematic cross-sectional view of a reinforcing member 1A according to a first modification example. As shown in FIG. 4, at least a part of the second resin material 11 in the thickness direction is embedded in the first resin material 13. As a result, the step derived from the second resin material 11 that occurs in the vicinity of the protrusion portion 131 becomes smaller, and when the reinforcing member 1A is used, water is less likely to accumulate in the gap between the protrusion portion 131 and the second resin material 11. Therefore, the decrease in the adhesion of the second resin material 11 with the first resin material 13 is suppressed.

The thickness d of the embedded portion of the second resin material 11 is preferably more than 5% and 50% or less with respect to the thickness t of the second resin material 11. With the thickness more than 50%, the adhesion may be deteriorated by water. With the thickness more than 50%, it may be difficult to manufacture, and in a case where the second resin material 11 has conductivity such as CFRP, dissimilar material contact corrosion with the steel sheet 20 may occur. That is, the ratio (thickness ratio of the embedded portion) d/t of the thickness d of the embedded portion of the second resin material 11 to the thickness t of the second resin material 11 is preferably more than 5% and 50% or less. As a result, in addition to the above-mentioned effect in which water is less likely to accumulate in the gap between the protrusion portion 131 and the second resin material 11, this allows the first resin material 13 to further firmly fix the second resin material 11. Therefore, the first resin material 13 can further relieve the stress between the second resin material 11 and the steel sheet 20 in a thermal environment, and as a result, exfoliation and deterioration of adhesion are further prevented. The range of the protrusion amount X is the same as that of the above-mentioned embodiment.

The reinforcing member 1A according to the first modification example can be manufactured by any of the above-mentioned manufacturing methods 1 to 3. Here, the thickness ratio d/t of the embedded portion can be adjusted by adjusting the conditions during thermocompression bonding. Specifically, the heating temperature may be, for example, 100° C. or higher, preferably 150° C. or higher and 300° C. or lower. Further, the pressure during thermocompression bonding may be, for example, 2 MPa or more and 10 MPa or less, preferably 3 MPa or more and 5 MPa or less. Further, the thermocompression bonding time may be, for example, 3 minutes or more and 60 minutes or less, preferably 5 minutes or more and 20 minutes or less. The ratio (thickness ratio of the embedded portion) d/t of the thickness d of the embedded portion of the second resin material 11 to the thickness t of the second resin material 11 can be controlled by controlling the pressing depth of a pressurizing device used for thermocompression bonding. It is troublesome to measure the pressing amount during pressurization. Further, there is a case where the thickness ratio (d/t) of the embedded portion does not necessarily become the expected thickness ratio (d/t) only by controlling the pressing amount, and in such a case, remanufacturing is required. Therefore, a stopper may be provided around the member. For example, the thickness ratio can also be adjusted by embedding glass beads or the like in the first resin material 13 in advance and adjusting the particle size of the glass beads or the like (the thickness d of the embedded portion decreases as the particle size increases). Further, by embedding glass beads or the like having the same diameter as the desired thickness in the first resin material 13 in advance, the glass beads or the like act as a stopper. Thereby, the pressing depth of the pressurizing device can be controlled, and the thickness ratio can be adjusted.

4. Second Modification Example

Figure 5:
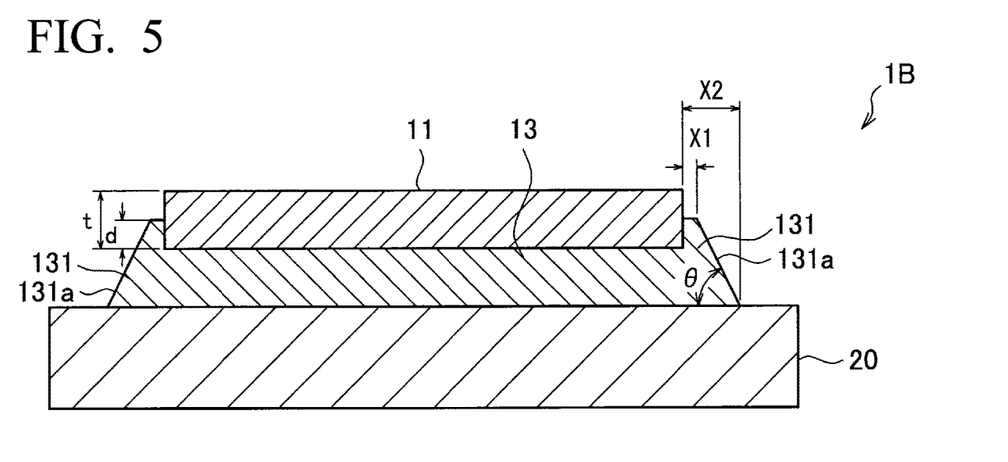
FIG. 5 is a schematic cross-sectional view of a reinforcing steel member according to a second modification example of the present embodiment.

FIG. 5 is a schematic cross-sectional view of a reinforcing member 1B according to a second modification example. As shown in FIG. 5, at least a part of the second resin material 11 in the thickness direction is embedded in the first resin material 13. As a result, the step derived from the second resin material 11 that occurs in the vicinity of the protrusion portion 131 becomes smaller, and when the reinforcing member 1B is used, water is less likely to accumulate in the gap between the protrusion portion 131 and the second resin material 11. Therefore, the decrease in the adhesion of the second resin material 11 with the first resin material 13 is suppressed. The range of the thickness ratio d/t of the embedded portion may be the same as that of the first modification example.

Furthermore, in the second modification example, the side surface 131a of the protrusion portion 131 is inclined toward the end portion of the steel sheet 20 closest to the protrusion portion 131 (in other words, the end portion present on the protrusion direction side of the protrusion portion 131). Since the protrusion portion 131 has an inclination in this way, it becomes more difficult for water to accumulate at the boundary portion between the protrusion portion 131 and the steel sheet 20 when the reinforcing member 1B is used. Therefore, the decrease in the adhesion of the first resin material 13 and the steel sheet 20 is further suppressed. Furthermore, the corrosion of the steel sheet 20 can be further suppressed. Furthermore, since the protrusion amount X1 of the first resin material 13 on the second resin material 11 side and the protrusion amount X2 of the first resin material 13 on the steel sheet 20 side are different, the first resin material 13 easily follows the deformation of the second resin material 11 and the steel sheet 20. As shown in FIG. 5, in a case where the end portion of the protrusion portion 131 is inclined, the protrusion amount X is defined as the protrusion amount X2. The inclination angle of the inclined structure may change in the middle of the inclined structure. However, in a case where the angle changes in the middle, it is preferable that the shape be such that water does not easily stagnate. Further, the inclined structure may be a curved surface in which the inclination angle changes continuously instead of a linear inclination.

The inclination angle θ (hereinafter, also referred to as "end portion inclination angle") formed by the side surface 131a of the protrusion portion 131 and the surface of the steel sheet 20 closest to the protrusion portion 131 (in other words, the surface on which the protrusion portion 131 is laminated) is preferably 45° or more and 90° or less, and more preferably 45° or more and 60° or less. In this case, the above-mentioned effect can be further enhanced. The inclination angle θ can be obtained from shape data measured by a contact displacement meter or a non-contact displacement meter. In a case where the side surface 131a of the protrusion portion 131 is a curved surface, for example, the inclination angle θ can be obtained by obtaining the tangent line at the contact point between the side surface 131a and the steel sheet 20.

The reinforcing member 1B according to the second modification example may be inclined, for example, by polishing or cutting the side surface 131a of the protrusion portion 131 after manufacturing the reinforcing member 1A according to the first modification example. Alternatively, since the first resin material 13 becomes soft during thermocompression bonding, the first resin material 13 may be molded at this point. Alternatively, the end portion of the resin sheet before thermocompression bonding may be inclined in advance by polishing or cutting, and then thermocompression bonding may be performed with the steel sheet 20 and FRP sheet. Considering workability and the like, a method of processing a resin sheet is preferable.

When a thermoplastic resin is used as the first resin material 13, the side surface 131a can be inclined by controlling the wet spread of the thermoplastic resin to the surface of the steel sheet 20. Specific methods for controlling the wet spread include improving the affinity between the thermoplastic resin and the steel sheet 20 and controlling the viscous flow during crimping by adjusting the melt flow index of the thermoplastic resin.

5. Uses

Next, the use of the reinforcing member according to the present embodiment will be described. The reinforcing member according to the present embodiment is suitable for components for a vehicle.

The component for a vehicle to which the reinforcing member according to the present embodiment is applied is not particularly limited, and examples thereof include a closed cross section member joined by a flange (for example, an A pillar, a B pillar, a side sill, or the like), a member in which a material is partially laminated for the purpose of reinforcement, stiffening, or the like (for example, a B pillar reinforcement, an outer panel), and a panel member having a hemmed portion (a door, a hood, or the like).

EXAMPLES

Hereinafter, the present invention will be described in more detail with reference to the examples. It should be noted that the examples described below are merely examples of the present invention and do not limit the present invention.

1. Material Preparation

A steel sheet, a resin sheet (first resin material) and an FRP sheet (second resin material) having the characteristics shown in Table 1 were prepared. The size of the steel sheet was length×width=200 mm×70 mm, and the size of the FRP sheet was length×width=100 mm×50 mm. Some steel sheets were subjected to hot-dip galvannealing. The Young's modulus of the resin sheet and the FRP sheet was measured by the above-mentioned tensile test (however, the test pieces were not collected from the reinforcing member by machining, but were measured using resin sheets and FRP sheets prepared in advance (before thermocompression bonding to the steel sheet)). The contact angle of the resin sheet was measured as a static contact angle with water by the above-mentioned contact angle meter (contact angle meter manufactured by Kyowa interface Science Co., Ltd.). The types of resin sheets are classified into the following A to E. CFRP is the carbon fiber reinforced plastic described above, and GFRP is a glass fiber reinforced plastic.

A: Nylon 6 (A1030BRL, manufactured by Unitika Ltd.)

B: Polyester-based thermoplastic elastomer (PRIMALLOY (registered trademark), manufactured by Mitsubishi Chemical Corporation)

C: Fluororesin (Fluon (registered trademark), manufactured by Asahi Glass Co., Ltd.)

D: One obtained by adding 10% by mass of magnesium phosphate to A

E: One obtained by adding 10% by volume of ferrosilicon to A

TABLE 1

| | Steel sheet | | Resin sheet (first resin material) | | | | FRP sheet (second resin material) | | |
|---|---|---|---|---|---|---|---|---|---|
| | With or without plating | Thickness (mm) | Type | Young's modulus (MPa) | Contact angle (°) | Thickness (mm) | Type | Young's modulus (MPa) | Thickness (mm) |
| Comparative Example 1 | non-plating | 0.6 | A | $1.0 \times 10^3$ | 65 | 0.3 | GFRP | $1.6 \times 10^4$ | 0.5 |
| Comparative Example 2 | non-plating | 0.6 | A | $1.0 \times 10^3$ | 65 | 0.3 | CFRP | $6.0 \times 10^4$ | 0.5 |
| Comparative Example 3 | non-plating | 0.6 | A | $1.0 \times 10^3$ | 65 | 0.3 | GFRP | $1.6 \times 10^4$ | 0.5 |
| Example 1 | non-plating | 0.6 | A | $1.0 \times 10^3$ | 65 | 0.3 | GFRP | $1.6 \times 10^4$ | 0.5 |
| Example 2 | non-plating | 0.6 | A | $1.0 \times 10^3$ | 65 | 0.3 | GFRP | $1.6 \times 10^4$ | 0.5 |
| Example 3 | non-plating | 0.6 | A | $1.0 \times 10^3$ | 65 | 0.3 | GFRP | $1.6 \times 10^4$ | 0.5 |
| Example 4 | non-plating | 0.6 | B | $1.0 \times 10^2$ | 70 | 0.3 | GFRP | $1.6 \times 10^4$ | 0.5 |
| Example 5 | non-plating | 0.6 | B | $1.0 \times 10^2$ | 70 | 0.3 | CFRP | $6.0 \times 10^4$ | 0.5 |
| Example 6 | non-plating | 0.6 | B | $1.0 \times 10^2$ | 70 | 0.3 | GFRP | $1.6 \times 10^4$ | 0.5 |
| Example 7 | non-plating | 0.6 | B | $1.0 \times 10^2$ | 70 | 0.3 | GFRP | $1.6 \times 10^4$ | 0.5 |
| Example 8 | non-plating | 0.6 | A | $1.0 \times 10^3$ | 70 | 0.3 | GFRP | $1.6 \times 10^4$ | 0.5 |
| Example 9 | non-plating | 0.6 | A | $1.0 \times 10^3$ | 70 | 0.3 | GFRP | $1.6 \times 10^4$ | 0.5 |
| Example 10 | non-plating | 0.6 | C | $7.0 \times 10^2$ | 108 | 0.3 | GFRP | $1.6 \times 10^4$ | 0.5 |
| Example 11 | non-plating | 0.6 | D | $1.0 \times 10^3$ | 72 | 0.3 | GFRP | $1.6 \times 10^4$ | 0.5 |
| Example 12 | non-plating | 0.6 | E | $1.0 \times 10^3$ | 70 | 0.3 | GFRP | $1.6 \times 10^4$ | 0.5 |
| Example 13 | plating | 0.6 | A | $1.0 \times 10^3$ | 70 | 0.3 | GFRP | $1.6 \times 10^4$ | 0.5 |
| Example 14 | non-plating | 0.6 | A | $1.0 \times 10^3$ | 70 | 0.3 | GFRP | $1.6 \times 10^4$ | 0.5 |
| Example 15 | non-plating | 0.6 | C | $7.0 \times 10^2$ | 108 | 0.3 | GFRP | $1.6 \times 10^4$ | 0.5 |
| Example 16 | non-plating | 0.6 | B | $1.0 \times 10^2$ | 70 | 0.3 | GFRP | $1.6 \times 10^4$ | 0.5 |
| Example 17 | non-plating | 0.6 | B | $1.0 \times 10^2$ | 70 | 0.3 | GFRP | $1.6 \times 10^4$ | 0.5 |
| Example 18 | non-plating | 0.6 | B | $1.0 \times 10^2$ | 70 | 0.3 | GFRP | $1.6 \times 10^4$ | 0.5 |
| Example 19 | non-plating | 0.6 | B | $1.0 \times 10^2$ | 70 | 0.3 | GFRP | $1.6 \times 10^4$ | 0.5 |
| Example 20 | non-plating | 0.6 | A | $1.0 \times 10^3$ | 65 | 1.0 | GFRP | $1.6 \times 10^4$ | 0.5 |
| Example 21 | non-plating | 0.6 | A | $1.0 \times 10^3$ | 65 | 1.4 | GFRP | $1.6 \times 10^4$ | 0.5 |
| Example 22 | non-plating | 0.6 | B | $1.0 \times 10^2$ | 70 | 0.6 | GFRP | $1.6 \times 10^4$ | 1.2 |
| Example 23 | non-plating | 1.2 | B | $1.0 \times 10^2$ | 70 | 1.0 | GFRP | $1.6 \times 10^4$ | 2.5 |

2. Manufacture of Reinforcing Members

The resin sheet and the FRP sheet were laminated on the steel sheet and thermocompression-bonded so that the laminated structure of the resin sheet and the FRP sheet had the structure shown in Table 2. Here, by adjusting the area (size) of the resin sheet, the protrusion amount X of the protrusion portion 131 described above was adjusted. However, the protrusion amount in the width direction was set to 0 mm in all Examples and Comparative Examples. That is, the protrusion amount in Table 2 indicates the protrusion amount in the longitudinal direction. Further, in Examples in which the thickness ratio of the embedded portion was controlled, predetermined glass beads were dispersed on the resin sheet in advance and thermocompression-bonded. Then, the thickness ratio d/t of the embedded portion was adjusted by adjusting the particle size of the glass beads. Regarding thermocompression bonding conditions (pressures, temperatures, and times), pressures were set to 3 MPa and times were set to 10 minutes in Comparative Examples 1, 2, and 3 and Examples 10 and 19 in which no embedded portion was provided, and pressures were set to 5 MPa and times were set to 10 minutes in Examples in which embedded portions were provided using glass beads. The temperature was 200° C. for the resin sheets A, D, and E, 210° C. for the resin sheet B, and 250° C. for the resin sheet C, regardless of whether or not the embedded portion was provided. A reinforcing member was produced by the above steps. In Examples in which the end portion inclination angle was set to less than 90°, a predetermined inclination angle was provided by a cutter after manufacturing the reinforcing member. The protrusion amount of Examples in which the end portion inclination angle is less than 90° indicates the protrusion amount on the steel sheet side (X2 in FIG. 3).

TABLE 2

| | Laminated structure | | | |
|---|---|---|---|---|
| | Protrusion amount X or (X2) of protrusion portion (mm) | With or without embedding | Thickness ratio of embedded portion (%) | End portion inclination angle (°) |
| Comparative Example 1 | 0.0 | non-embedded | 0 | 90 |
| Comparative Example 2 | 0.0 | non-embedded | 0 | 90 |
| Comparative Example 3 | 2.0 | non-embedded | 0 | 90 |
| Example 1 | 5.0 | embedded | 10 | 90 |
| Example 2 | 30.0 | embedded | 10 | 90 |
| Example 3 | 3.0 | embedded | 10 | 90 |
| Example 4 | 5.0 | embedded | 10 | 90 |
| Example 5 | 5.0 | embedded | 10 | 90 |
| Example 6 | 5.0 | embedded | 25 | 90 |
| Example 7 | 5.0 | embedded | 50 | 90 |
| Example 8 | 5.0 | embedded | 10 | 45 |
| Example 9 | 5.0 | embedded | 10 | 60 |
| Example 10 | 5.0 | non-embedded | 0 | 90 |
| Example 11 | 5.0 | embedded | 10 | 90 |
| Example 12 | 5.0 | embedded | 10 | 90 |
| Example 13 | 5.0 | embedded | 10 | 90 |
| Example 14 | 15.0 | embedded | 10 | 90 |
| Example 15 | 5.0 | embedded | 10 | 90 |
| Example 16 | 5.0 | embedded | 5 | 90 |
| Example 17 | 5.0 | embedded | 3 | 90 |
| Example 18 | 5.0 | embedded | 60 | 90 |
| Example 19 | 5.0 | non-embedded | 0 | 90 |
| Example 20 | 5.0 | embedded | 10 | 90 |
| Example 21 | 5.0 | embedded | 10 | 90 |
| Example 22 | 6.0 | embedded | 10 | 90 |
| Example 23 | 7.0 | embedded | 10 | 90 |

(3.1 Evaluation of Baking Paintability)

The reinforcing member produced above was treated under the same heating conditions as the baking coating conditions (180° C., allowed to stand for 30 minutes). One end of the long side of the treated reinforcing member was fixed to a flat base, the perpendicular distance between the other end portion and the base was measured, and the measured value was taken as the warpage amount of the reinforcing member after the heat treatment. Further, the evaluation of the reinforcing member after the heat treatment was evaluated by the external appearance and the warpage amount. The evaluation results are shown in Table 3.

A: warpage amount of less than 0.01 mm
B: warpage amount of 0.01 mm or more and less than 0.05 mm
C: warpage amount of 0.05 mm or more and less than 0.10 mm
D: warpage amount of 0.10 mm or more
E: warpage amount of 0.10 mm or more and exfoliation occurred (3.2 Evaluation of Water Resistance Adhesion)

The reinforcing member produced as described above was left to stand for 500 hours in a thermo-hygrostat in a moist environment at 80° C. and a relative humidity of 95% to promote deterioration of the first resin material/steel sheet interface and the second resin material/first resin material interface.

Then, a three-point bending test was carried out with a fulcrum-to-fulcrum distance of 150 mm, a support portion R5 mm and an indenter R5 mm. The surface with which the indenter contacts is the steel sheet side. The reinforcing member was distorted by a three-point bending test until exfoliation occurred at any of the above interfaces, and the displacement of the indenter at the time of exfoliation was recorded. The water resistance adhesion was evaluated by the reduction rate of indenter displacement before and after deterioration when exfoliation occurred. The evaluation results are shown in Table 3.

A: reduction rate of less than 10%
B: reduction rate of 10% or more and less than 20%
C: reduction rate of 20% or more and less than 30%
D: reduction rate of 30% or more (3.3 Corrosion Resistance Evaluation)

The reinforcing member was manufactured by the same method as described in <2. Manufacture of reinforcing members> except that the size of the steel sheet was made to be length×width=200 mm×150 mm, the size of the FRP sheet was made to be length×width=100 mm×50 mm, and the protrusion amount in the width direction was made to be the same as the protrusion amount in the longitudinal direction. Then, the surface of the reinforcing member was adjusted for 20 seconds at room temperature using the surface adjusting agent PREPALENE X (trade name) manufactured by Nihon Parkerizing Co., Ltd. Further, zinc phosphate treatment was carried out using a chemical conversion treatment solution (zinc phosphate treatment liquid) "PALBOND 3020 (trade name)" manufactured by Nihon Parkerizing Co., Ltd. Then, a cationic electrodeposition coating manufactured by Nippon Paint Holdings Co., Ltd. was electrodeposited on the reinforcing member after the zinc phosphate treatment by energizing a slope at a voltage of 160 V, and further baked and painted at a baking temperature of 170° C. for 20 minutes. Then, the corrosion resistance of the reinforcing member after the baking and painting was evaluated by a cycle corrosion test. Specifically, a cycle corrosion test was carried out with a total of 8 hours of salt spraying for 2 hours, drying for 2 hours, and wetting for 4 hours as one cycle. The conditions for salt spraying were as specified in Annex C (regulation) cycle A of JIS K5600-7-9:1999. The drying conditions were a temperature of 50° C. and a humidity of 30% RH or less, and the wetting conditions were a temperature of 35° C. and a humidity of 95%

RH or more. Then, the corrosion resistance of the reinforcing member was evaluated as follows. The evaluation results are shown in Table 3.

A: red rust, which indicates a decrease in the sheet thickness of the steel sheet, does not occur even after 240 cycles B: red rust, which indicates a decrease in the sheet thickness of the steel sheet, occurs between 180 and 240 cycles D: red rust occurs in cycles less than 180

TABLE 3

| | External appearance after heating at 180° C. (baking paintability evaluation) | Adhesion strength after moist environment (water-resistance adhesion evaluation) | External appearance after corrosion resistance test (corrosion resistance evaluation) |
|---|---|---|---|
| Comparative Example 1 | E | D | D |
| Comparative Example 2 | D | D | D |
| Comparative Example 3 | D | D | D |
| Example 1 | B | B | B |
| Example 2 | B | B | B |
| Example 3 | C | C | B |
| Example 4 | A | B | B |
| Example 5 | A | B | B |
| Example 6 | B | A | B |
| Example 7 | B | A | B |
| Example 8 | B | A | A |
| Example 9 | B | A | A |
| Example 10 | B | A | A |
| Example 11 | B | A | A |
| Example 12 | B | A | A |
| Example 13 | B | A | B |
| Example 14 | B | B | B |
| Example 15 | B | A | A |
| Example 16 | A | B | B |
| Example 17 | A | C | B |
| Example 18 | A | C | A |
| Example 19 | A | B | B |
| Example 20 | B | B | B |
| Example 21 | B | B | B |
| Example 22 | A | B | B |
| Example 23 | A | B | B |

4. Consideration of Evaluation Results

According to Table 3, in Examples 1 to 23 satisfying the requirements of the present embodiment, better results of baking paintability, water resistance adhesion, and corrosion resistance than those of Comparative Examples 1 to 3 were obtained. That is, in Examples 1 to 23, generation of stress between the steel sheet and the FRP (second resin material) due to heat was able to be suppressed, adhesion between the steel sheet and the FRP was able to be maintained, and corrosion of the steel sheet was able to be suppressed even in an environment in which water or steam may be present in the surroundings. In particular, even in a case where the second resin material is CFRP, corrosion of the steel sheet could be suppressed. On the other hand, in Comparative Examples 1 to 3 which did not satisfy the requirements of the present embodiment, the results of baking paintability, water resistance adhesion, and corrosion resistance were rated as D or below D.

When the results of Examples 1 to 23 were examined in more detail, in Example 3 in which the protrusion amount was 3.0 mm, the results of evaluating the paintability and the water resistance adhesion were better than those of Comparative Example 3 in which the protrusion amount was 2.0 mm. The results of evaluating the paintability and the water resistance adhesion were slightly poorer than those of the other Examples in which the protrusion amount was 5.0 mm or more and 30.0 mm or less. Therefore, it can be seen that the protrusion amount is preferably 5.0 mm or more and 30.0 mm or less.

Further, in Examples 4 and 5 in which the Young's modulus of the first resin material was $1/100$ or less of the Young's modulus of the second resin material, better baking paintability was obtained as compared with the other examples. Therefore, it can be seen that the Young's modulus of the first resin material is preferably $1/100$ or less of the Young's modulus of the second resin material.

In Examples 7 and 16, the second resin material was embedded in the first resin material, and the thickness ratio d/t of the embedded portion was 50% and 5%, respectively. Then, in Examples 7 and 16, good water resistance adhesion was obtained. Therefore, it can be seen that it is preferable that the second resin material is embedded in the first resin material, and that the thickness ratio d/t of the embedded portion is 5% or more and 50% or less.

In Examples 8 and 9, the end portion of the first resin material is inclined, and the end portion inclination angle is 45° or 60°. Then, in Examples 8 and 9, good water resistance adhesion and corrosion resistance were obtained. Therefore, it can be seen that it is preferable that the end portion of the first resin material is inclined and that the end portion inclination angle is 45° or more and 60° or less.

In Example 10, the contact angle of the first resin material with water was 108°. Then, in Example 10, good water resistance adhesion and corrosion resistance were obtained. Therefore, it can be seen that the contact angle of the first resin material with water is preferably 90° or more.

In Examples 11 and 12, a rust preventive pigment or a conductive pigment was added to the first resin material. Then, in Examples 11 and 12, good water resistance adhesion and corrosion resistance were obtained. Therefore, in Example 11, it can be seen that the corrosion resistance is improved by the effect of the rust preventive pigment. In Example 12, it can be seen that the corrosion resistance is improved because the electrodeposition coating covers up to the end portion of the reinforcing member due to the effect of the conductive pigment. In Example 13, the steel sheet was plated. Then, in Example 13, good water resistance adhesion was obtained. Therefore, it can be seen that it is preferable that the steel sheet is plated.

Although the preferred embodiments of the present invention have been described in detail with reference to the accompanying drawings, the present invention is not limited to such examples. It is obvious that a person having ordinary knowledge in the field of technology to which the present invention belongs can conceive of various examples of changes or modifications within the scope of the technical ideas described in the claims, and these are naturally understood to belong to the technical scope of the present invention.

INDUSTRIAL APPLICABILITY

According to the present invention, it is possible to suppress generation of stress between a steel sheet and an FRP due to heat, maintain adhesion between the steel sheet and the FRP even in an environment in which water or steam may be present around the steel sheet, and suppress corrosion of the steel sheet. Therefore, the present invention has extremely high industrial applicability.

BRIEF DESCRIPTION OF THE REFERENCE SYMBOLS 1, 1A, 1B reinforcing member
11 second resin material
13 first resin material
111, 131 protrusion portion
111a, 131a side surface
20 steel sheet
d thickness of embedded portion of second resin material
t thickness of second resin material
X, X1, X2 length (protrusion amount)
θ, θb inclination angle
θa contact angle with water

The invention claimed is:

1. A reinforcing steel member for a motor vehicle, comprising:
   a steel sheet;
   a first resin material disposed on at least a part of a surface of the steel sheet; and
   a second resin material disposed on at least a part of a surface of the first resin material and having a matrix resin and a reinforcing fiber material contained in the matrix resin,
   wherein in a cross section of the first resin material and the second resin material perpendicular to the surface of the steel sheet, between one end portion of the second resin material and the other end portion of the second resin material, there is a portion having a length of 80 mm or more along a boundary between the second resin material and the first resin material,
   in the first resin material, a protrusion portion having a length X of 5.0 mm or more from the two end portions of the second resin material to an end portion of the first resin material is formed in the cross section,
   a Young's modulus of the first resin material room temperature is 1/10 or less of a Young's modulus of the second resin material at room temperature;
   at least a part of the second resin material in a thickness direction is embedded in the first resin material, and
   a thickness of the embedded portion of the second resin material embedded in the first resin material is 5% or more and 50% or less with respect to a thickness of the second resin material.

2. The reinforcing steel member for a motor vehicle according to claim 1, wherein the length X is 30.0 mm or less.

3. The reinforcing steel member for a motor vehicle according to claim 1, wherein a side surface of the protrusion portion is inclined toward an end portion of the steel sheet closest to the protrusion portion.

4. The reinforcing steel member for a motor vehicle according to claim 3, wherein an inclination angle formed by the side surface and the surface of the steel sheet closest to the protrusion portion is 45° or more and 90° or less.

5. The reinforcing steel member for a motor vehicle according to claim 1, wherein a contact angle of the first resin material with water at room temperature is 90° or more.

6. The reinforcing steel member for a motor vehicle according to claim 1, wherein the first resin material contains one or more of a rust preventive pigment and a conductive pigment.

7. The reinforcing steel member for a motor vehicle according to claim 1, wherein the steel sheet is a plated steel sheet.

* * * * *